United States Patent

Moffett et al.

[11] Patent Number: 5,328,321
[45] Date of Patent: Jul. 12, 1994

[54] MULTI-STAGE MAST FOR A FORKLIFT TRUCK

[75] Inventors: Carol Moffett; James McAdam, both of Monaghan, Ireland

[73] Assignee: Moffett Research and Development Limited, Ireland

[21] Appl. No.: 921,899

[22] Filed: Jul. 29, 1992

[30] Foreign Application Priority Data

Sep. 5, 1991 [IE] Ireland ............................ 3122/91
Sep. 5, 1991 [IE] Ireland ............................ 3123/91

[51] Int. Cl.$^5$ ............................................. B66F 9/08
[52] U.S. Cl. ................................. 414/631; 414/635; 414/637; 414/663; 187/9 E
[58] Field of Search .................. 414/630–638, 414/663–667, 672; 187/9 E

[56] References Cited

U.S. PATENT DOCUMENTS

| | | | |
|---|---|---|---|
| 3,672,526 | 6/1972 | Hansen | 414/666 |
| 3,768,595 | 10/1973 | Kelley, Jr. | 414/634 X |
| 3,930,563 | 1/1976 | Abels | 414/634 X |
| 3,934,681 | 1/1976 | Herrell | 187/9 E X |
| 3,998,345 | 12/1976 | Fiehler et al. | 414/666 X |
| 4,051,970 | 10/1977 | Ramsey | 414/630 |
| 4,675,827 | 6/1987 | Narita | 414/636 X |
| 4,762,203 | 8/1988 | Ryan | 187/9 E |
| 4,921,075 | 5/1990 | Schumacher et al. | 414/663 X |
| 5,036,952 | 8/1991 | Harper | 414/665 X |

FOREIGN PATENT DOCUMENTS

| | | | |
|---|---|---|---|
| 2578235 | 9/1986 | France | 414/631 |
| 870361 | 6/1961 | United Kingdom . | |
| 1253772 | 11/1971 | United Kingdom . | |
| 1317859 | 5/1973 | United Kingdom . | |
| 1550373 | 8/1979 | United Kingdom . | |
| 2016409 | 9/1979 | United Kingdom . | |
| 2016410 | 9/1979 | United Kingdom . | |
| 2032883 | 5/1980 | United Kingdom . | |
| 2077224 | 12/1981 | United Kingdom . | |
| 2098582 | 11/1982 | United Kingdom | 414/664 |

*Primary Examiner*—Michael S. Huppert
*Assistant Examiner*—James Keenan
*Attorney, Agent, or Firm*—Scully, Scott, Murphy & Presser

[57] ABSTRACT

A three-stage mast (1) for a forklift truck and a forklift truck incorporating the mast (1). The mast (1) has an outer mast section (2) for mounting on the truck. A middle mast section (5) is slidably movable on the outer mast section (2) by rams (7). An inner mast section (12) is slidably mounted on the middle mast section (5) and carries a fork carriage (14). Lifting chains (20) and lowering chains (30) extend between the inner mast section (12) and outer mast section (2) passing over intermediate guides (24, 31) on the middle mast section (5). The chains (20, 30) raise and lower the inner mast section (12) on the middle mast section (5) when the rams (7) are operated. Similarly lifting chains (26) and lowering chains (34) extend between the middle mast section (5) and the fork carriage (14) via guides (27, 35) on the inner mast section (12) for movement of the fork carriage (14) on the inner mast section (12). The fork carriage (14) has a frame bracket (51) with a tine support member (52) rotatably mounted on the frame (51).

18 Claims, 15 Drawing Sheets

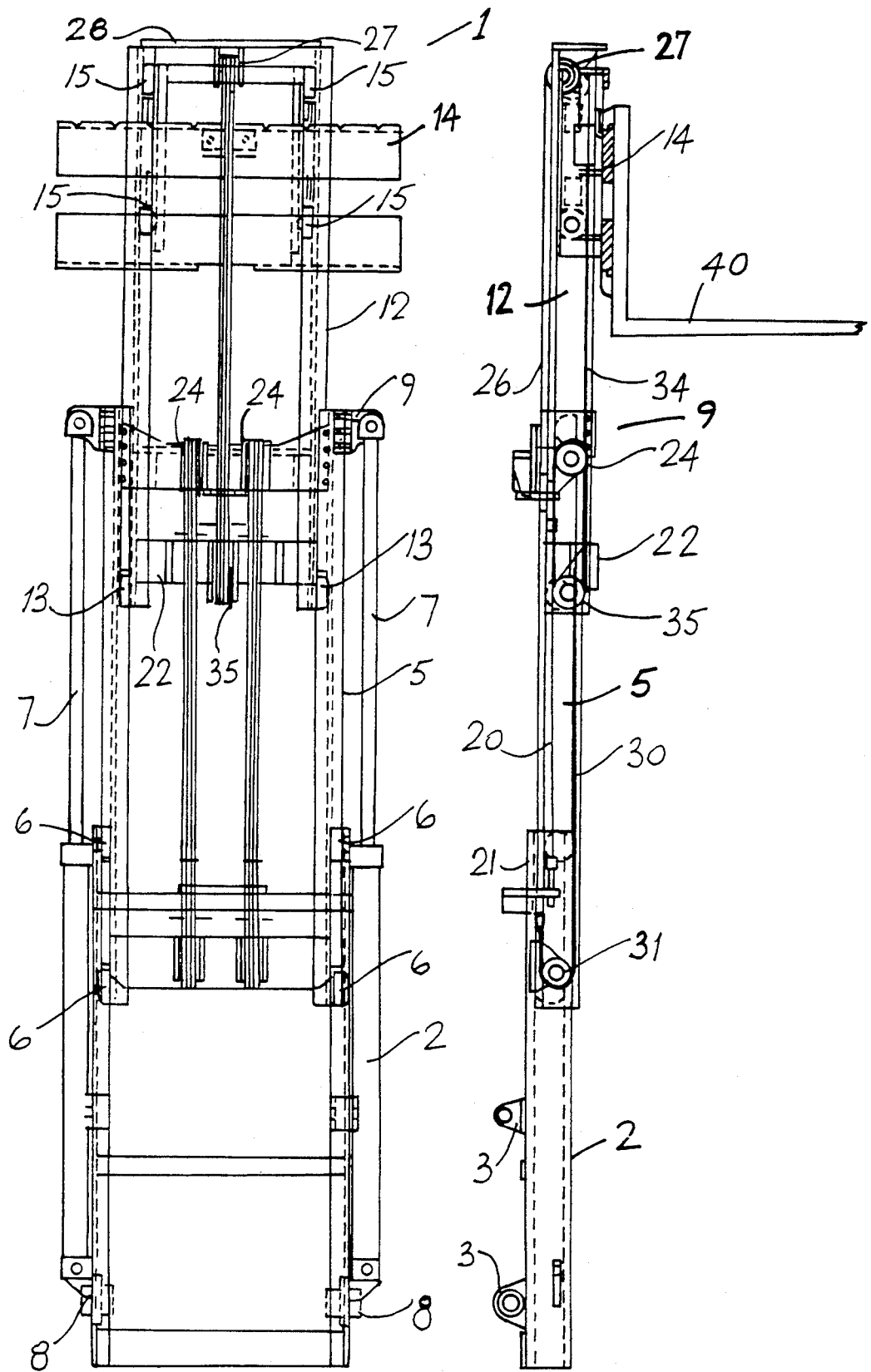

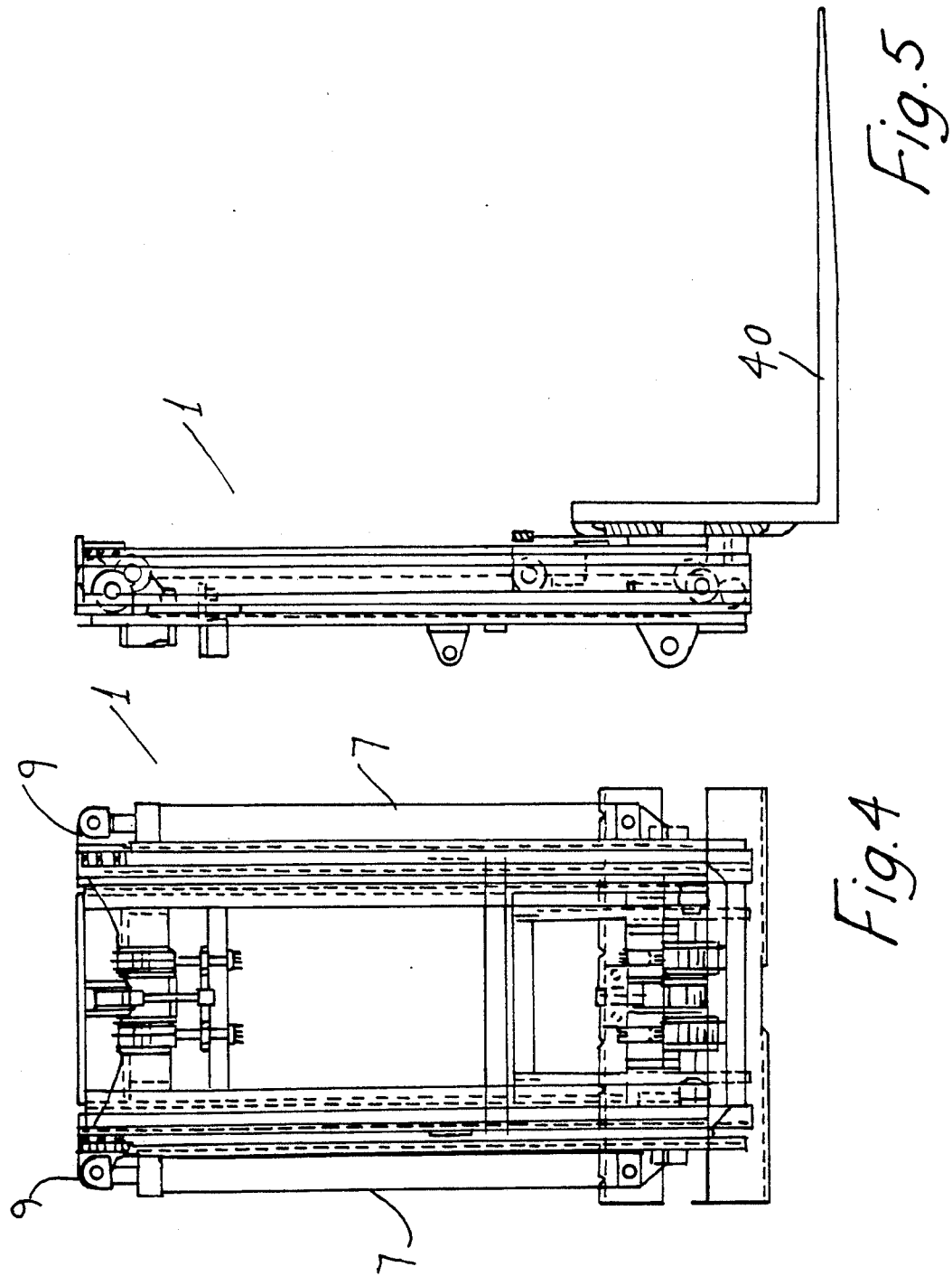

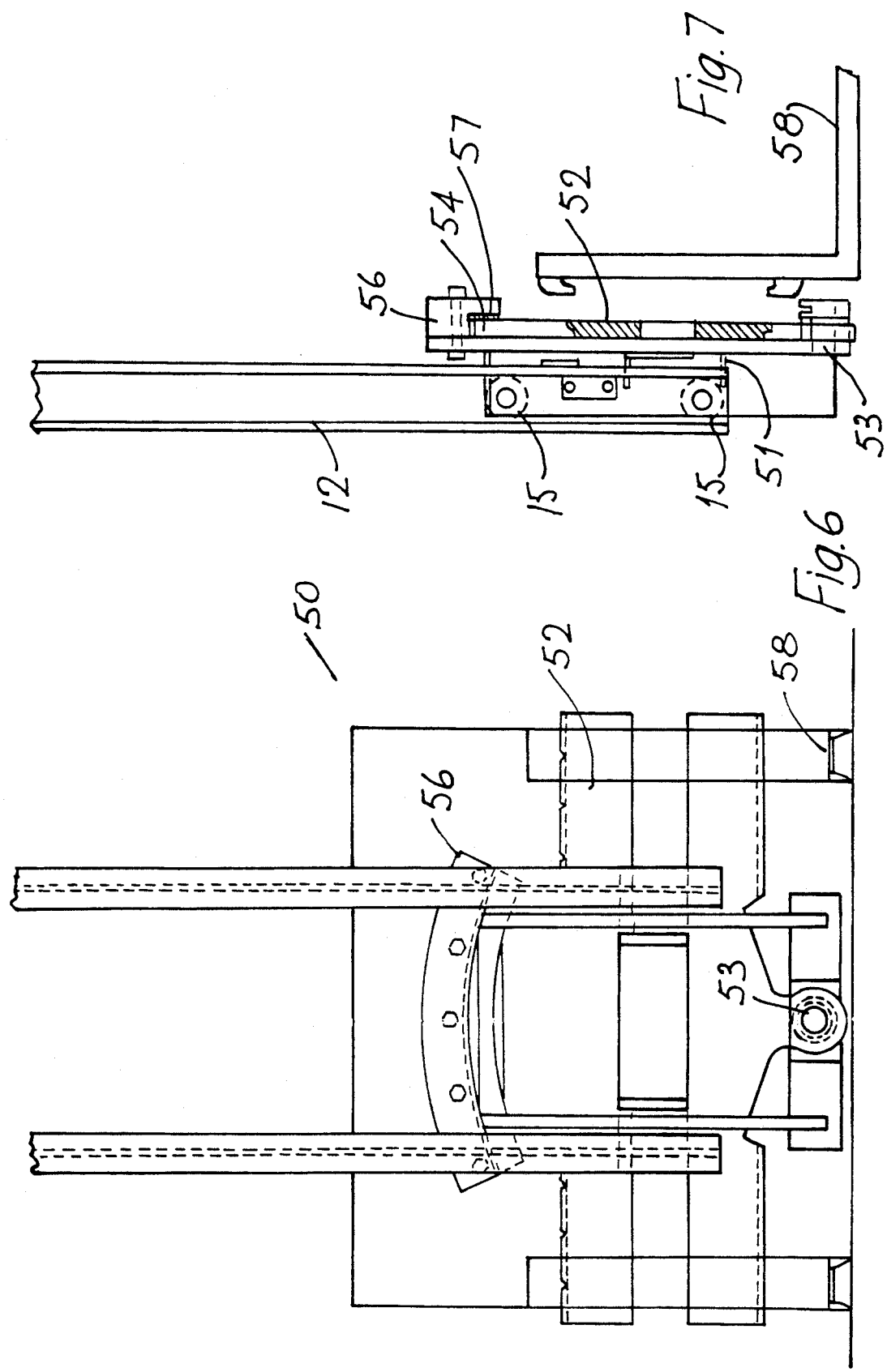

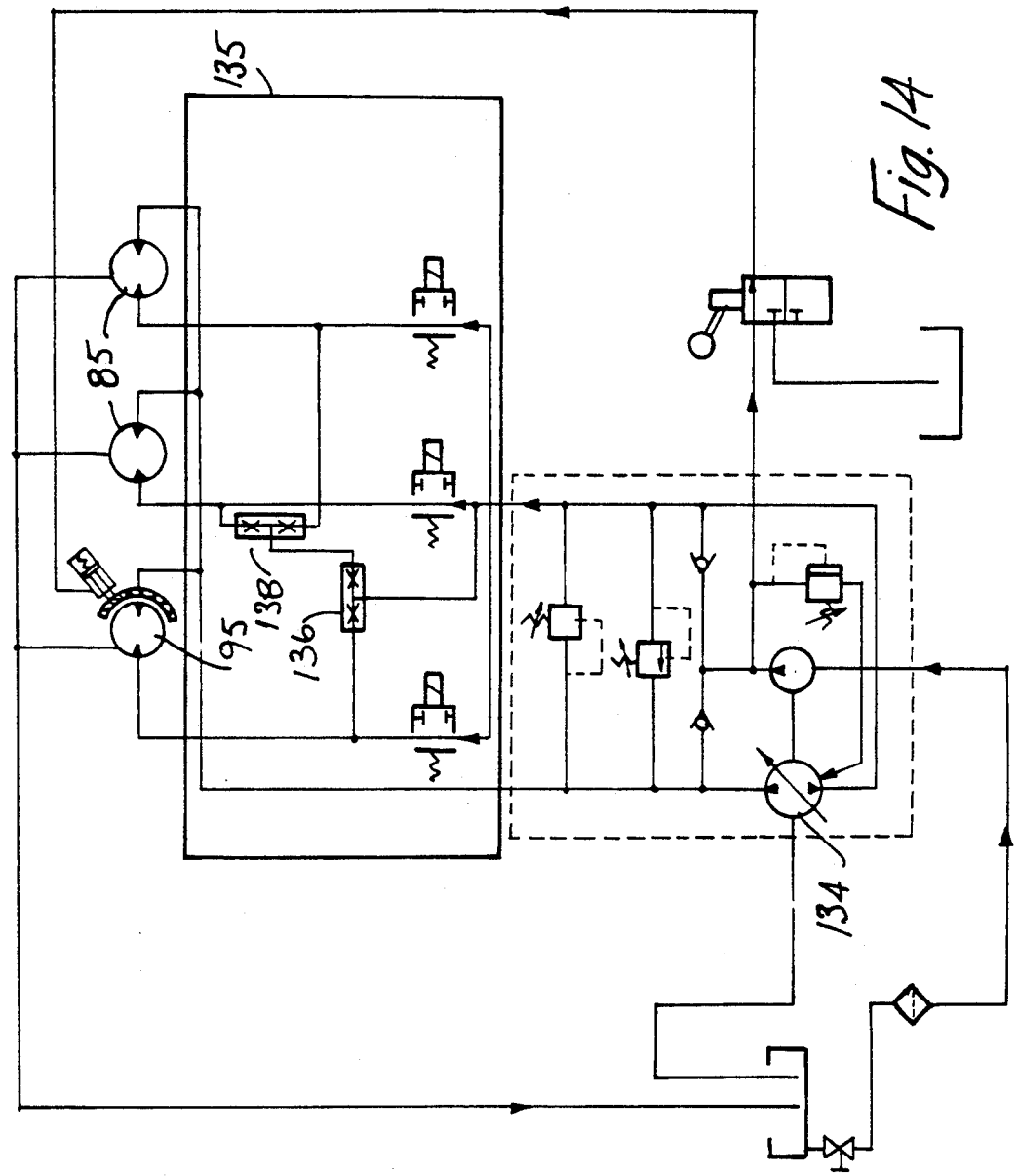

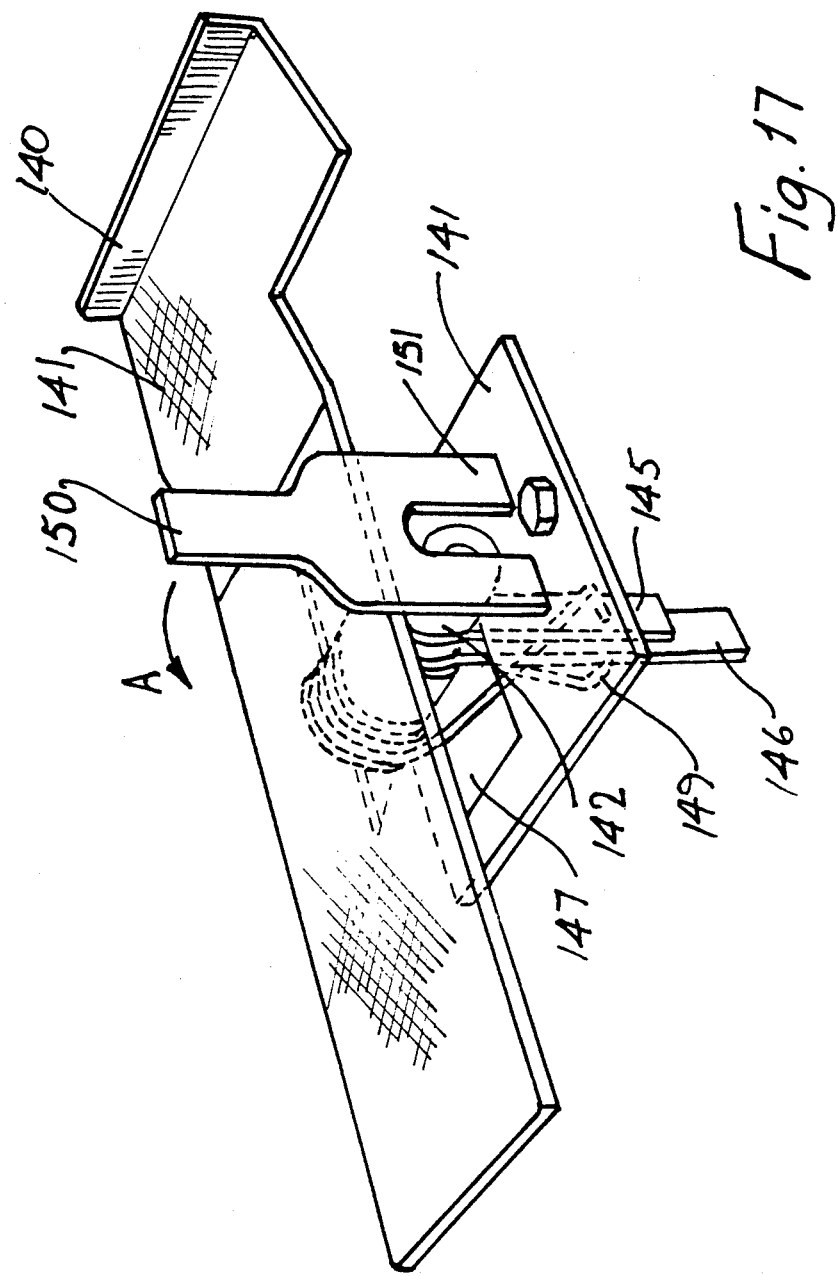

MULTI-STAGE MAST FOR A FORKLIFT TRUCK

TECHNICAL FIELD

This invention relates to a multi-stage mast for a forklift truck, and in particular to a three-stage mast.

DISCLOSURE OF INVENTION

According to the invention there is provided a double-acting multi-stage mast for a forklift truck, comprising at least three telescopic mast sections, namely, an outer mast section, a middle mast section and an inner mast section, the outer mast section for attachment to the truck, the middle mast section slidably mounted on the outer mast section, ram means extending between the middle mast section and the outer mast section for sliding the middle mast section on the outer mast section, the inner mast section slidably mounted on the middle mast section, an inner mast section lifting chain extending between the outer mast section and the inner mast section passing over an associated guide on the middle mast section, a fork carriage slidably mounted on the inner mast section, a fork carriage lifting chain extending between the middle mast section and the fork carriage passing over a guide on the inner mast section, an inner mast section lowering chain extending between the outer mast section and the inner mast section passing over a guide on the middle mast section, and a fork carriage lowering chain extending between the middle mast section and the fork carriage passing over a guide on the inner mast section.

In a preferred embodiment of the invention the mast is a three-stage mast comprising an outer mast section for attachment to the truck, a middle mast section slidably mounted on the outer mast section, ram means extending between the outer mast section and the middle mast section for sliding the middle mast section on the outer mast section, an inner mast section slidably mounted on the middle mast section with an inner mast section lifting chain extending between the outer mast section and a lower end of the inner mast section passing over a guide at an upper end of the middle mast section, a fork carriage slidably mounted on the inner mast section, a fork carriage lifting chain extending between the middle mast section and the fork carriage passing over a guide adjacent an upper end of the inner mast section, an inner mast section lowering chain extending between the outer mast section and a lower end of the inner mast section passing over a guide adjacent a lower end of the middle mast section, and a fork carriage lowering chain extending between the middle mast section and the fork carriage passing over a guide mounted adjacent the lower end of the inner mast section. This construction advantageously allows positive raising and lowering of tines mounted on the fork carriage by operation of the ram.

In one embodiment of the invention means is provided for pivotally mounting the mast on the forklift truck and means is provided for tilting the mast on the forklift truck. Preferably also the mounting means includes means for laterally moving the mast on the forklift truck.

In another embodiment of the invention, the fork carriage comprises a frame with a lifting attachment support rotatably mounted on the frame. Preferably, the lifting attachment support is pivotally mounted adjacent its lower end to the frame.

In a further embodiment the lifting attachment support is pivotable on the frame by means of a ram extending between the frame and the lifting attachment support.

In a preferred embodiment an upper periphery of the lifting attachment support is slidably mounted within a guide on the frame. Conveniently, the guide may be formed by an arcuate channel for reception of an upper arcuate peripheral portion of the lifting attachment support. Preferably a rubbing strip is provided within the channel between the lifting attachment support and the frame.

In another aspect the invention provides a fork carriage for a forklift truck comprising a frame for mounting on a mast of the forklift truck, the frame with a lifting attachment support means rotatably mounted on the frame.

In another aspect the invention provides a forklift truck incorporating a double-acting multi-stage mast as described above. Preferably the forklift truck comprises a wheeled chassis having a pair of front wheels and a pivotable rear wheel with an associated steering mechanism, drive means on the chassis for driving at least one wheel, the multi-stage mast mounted on the chassis between the two front wheels, the mast being mounted on the chassis by a support carriage movable in the chassis between the front wheels perpendicular to the axis of the front wheels, the mast pivotally mounted on the carriage for tilting movement about a transverse axis of the vehicle, and the mast being laterally movable on the carriage.

Preferably drive means is provided for each wheel, the drive means comprising an hydraulic motor mounted at each wheel, a pump to supply hydraulic fluid to drive the motors, and fluid supply divider means between the pump and the motors operable to regulate the supply of fluid to each wheel motor. Ideally the divider means is operable to deliver one-third of the fluid supply from the pump to each wheel motor.

In a further embodiment the rear wheel is mounted by a vertical pivot shaft on the chassis and the steering mechanism comprises a ram extending between the chassis and a steering arm on the pivot shaft, the ram operably connected to a steering wheel on the chassis.

In another embodiment the forklift truck has a drive pedal controlling power supply to the wheels, with a safety lock for the drive pedal operable to prevent operation of the drive pedal.

BRIEF DESCRIPTION OF THE DRAWINGS

The invention will be more clearly understood by the following description of some embodiments thereof, given by way of example only, with reference to the accompanying drawings, in which:

FIG. 2 is an elevational view of the mast, the mast being shown in an extended position;

FIG. 3 is a side elevational view of the mast of FIG. 1;

FIG. 4 is a front elevational view of the mast showing the mast in a collapsed position;

FIG. 5 is a side elevational view of the collapsed mast shown in FIG. 4;

FIG. 6 is a front elevational view of a fork carriage for mounting on the mast;

FIG. 7 is a side, partially exploded view of the fork carriage of FIG. 6;

FIG. 14 is a schematic illustration of a hydraulic drive circuit for wheels of the forklift truck;

FIG. 17 is a perspective view of a forward/reverse drive control pedal assembly used in the forklift truck;

DETAILED DESCRIPTION OF THE INVENTION

Figure 1:
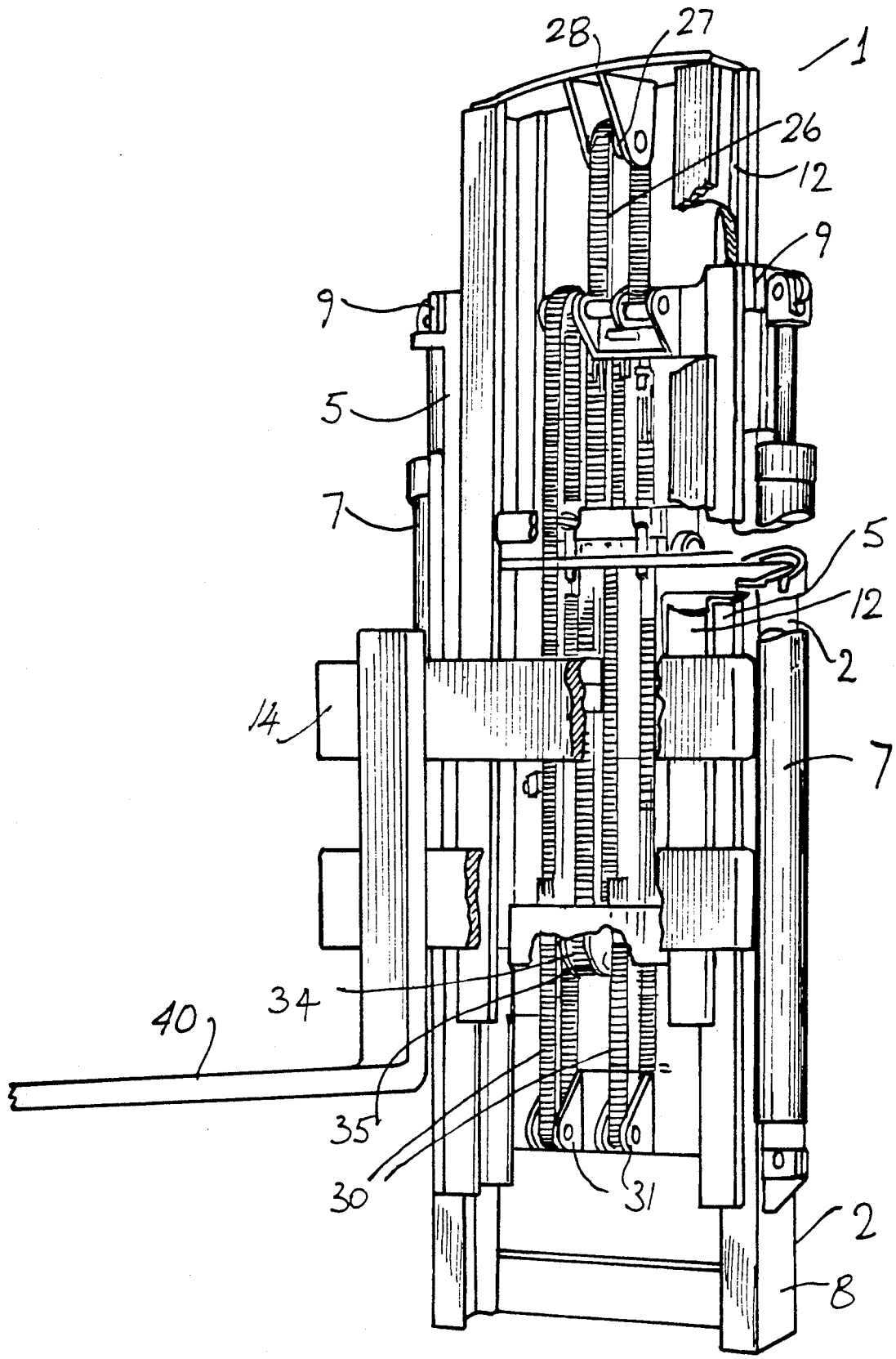
FIG. 1 is a perspective, partially cut-away view of a mast according to the invention for a forklift truck.

Referring to the drawings and initially to FIGS. 1 to 5 thereof, there is illustrated a double-acting three-stage mast according to the invention for a forklift truck, the mast indicated generally by the reference numeral 1. The mast 1 comprises a lower outer mast section 2 having mounting brackets 3 for attachment of the mast 1 to a forklift truck. A middle mast section 5 is telescopically slidable on the lower mast section 2, rollers 6 being provided between the mast sections 2, 5. A pair of rams 7 are mounted between a lower end 8 of the outer mast section 2 and an upper end 9 of the middle mast section 5. These rams 7 are operable to raise and lower the middle mast section 5 on the lower mast section 2. An inner mast section 12 is telescopically slidable on the middle mast section 5, rollers 13 being provided therebetween. A fork carriage 14 is slidable on the inner mast section 12 by means of rollers 15.

Inner mast section lifting chains 20 extend between an upper end 21 of the outer mast section 2 and a lower end 22 of the inner mast section 12 passing over guides 24 at an upper end 9 of the middle mast section 5.

Fork carriage lifting chains 26 extend between the middle mast section 5 and the fork carriage 14 passing over a guide 27 adjacent an upper end 28 of the inner mast section 12.

Inner mast section lowering chains 30 extend between the upper end 21 of the outer mast section 2 and a lower end of the inner mast section 12 passing over guides 31 at a lower end of the middle mast section 5. In similar fashion fork carriage lowering chains 34 extend between the upper end 9 of the middle mast section 5 and the fork carriage 14 passing over a guide 35 adjacent the lower end of the inner mast section 12.

In use, the rams 7 can be operated to raise and lower the fork carriage 14 by telescopic extension of the mast sections 2, 5, 12. It will be noted that only two rams are required extending between the outer mast section 2 and middle mast section 5, the lifting chains 20, 26 lifting the inner mast section 12 on the middle mast section 5 and the fork carriage 14 on the inner mast section 12 as the rams 7 are extended. As the rams 7 are lowered the lowering chains 30, 34 positively lower the fork carriage 14 on the inner mast section 12 and also the inner mast section 12 on the middle mast section 5. Thus, forks 40 mounted on the fork carriage 14 are positively driven at all times.

It will be appreciated that the construction of the three-stage mast 1 is such that it can be collapsed into a compact position as shown in FIGS. 4 and 5 with a low clearance height which is important when maneuvering a forklift truck through a relatively low doorway or the like.

Referring now to FIGS. 6 and 7, a fork carriage 50 for mounting on the mast 1 described previously or indeed any other type of associated mast for a forklift truck is shown. Parts similar to those in the previous drawings are given the same reference numerals. The fork carriage 50 comprises a frame 51 slidably mounted on the inner mast section 12 by means of the rollers 15. A tine support member 52 is rotatably mounted on the frame 51. The tine support member is mounted by a pivot pin 53 at its lower end to the support frame 51. An upper arcuate peripheral portion 54 of the tine support member 52 is held against the frame 51 by a clamping bracket 56 which overhangs the upper end 54 forming with the frame 51 an arcuate channel for reception of the peripheral portion 54 of the tine support member 52. A rubbing strip 57 is provided on the bracket 56. A ram (not shown) extends between the frame 51 and the tine support 52 and is operable for rotation of the tine support 52 on the support frame 51 to tilt the tine support 52 and hence any lifting forks 58 mounted on the tine support 52.

It will be appreciated that by incorporating a rotating tine support 52 within the fork carriage 50 a more compact construction is achieved than with bolt-on rotation units and any load carried on the forks 58 will have it's centre of gravity closer to the mast section 12 giving increased lifting capacity and greater safety in operation.

Figure 8:
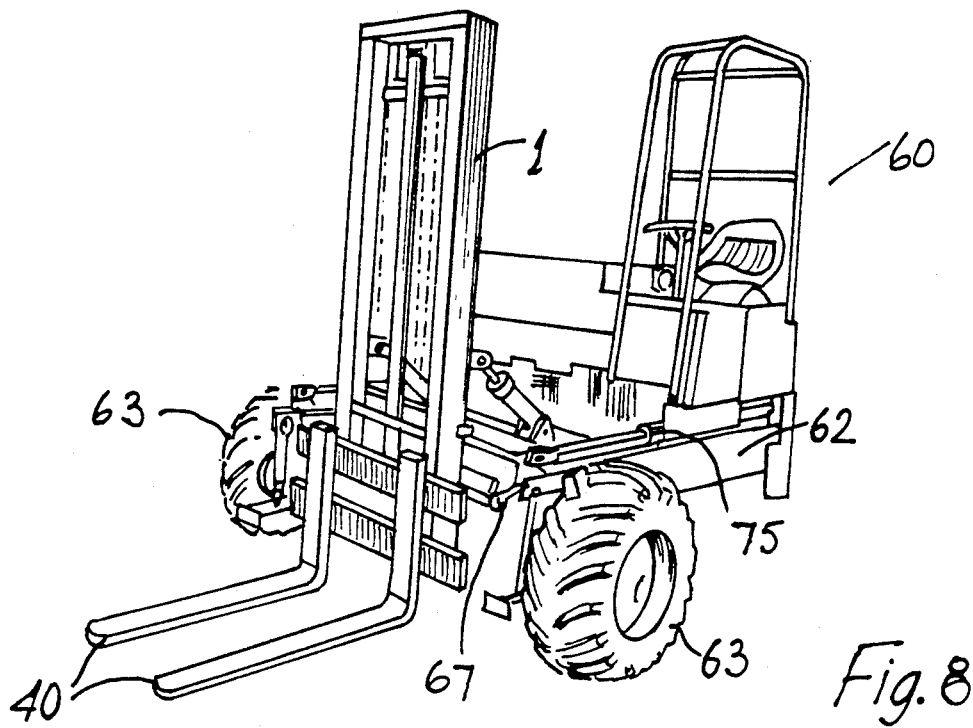
FIG. 8 is a front perspective view of a forklift truck according to the invention.
Figure 9:
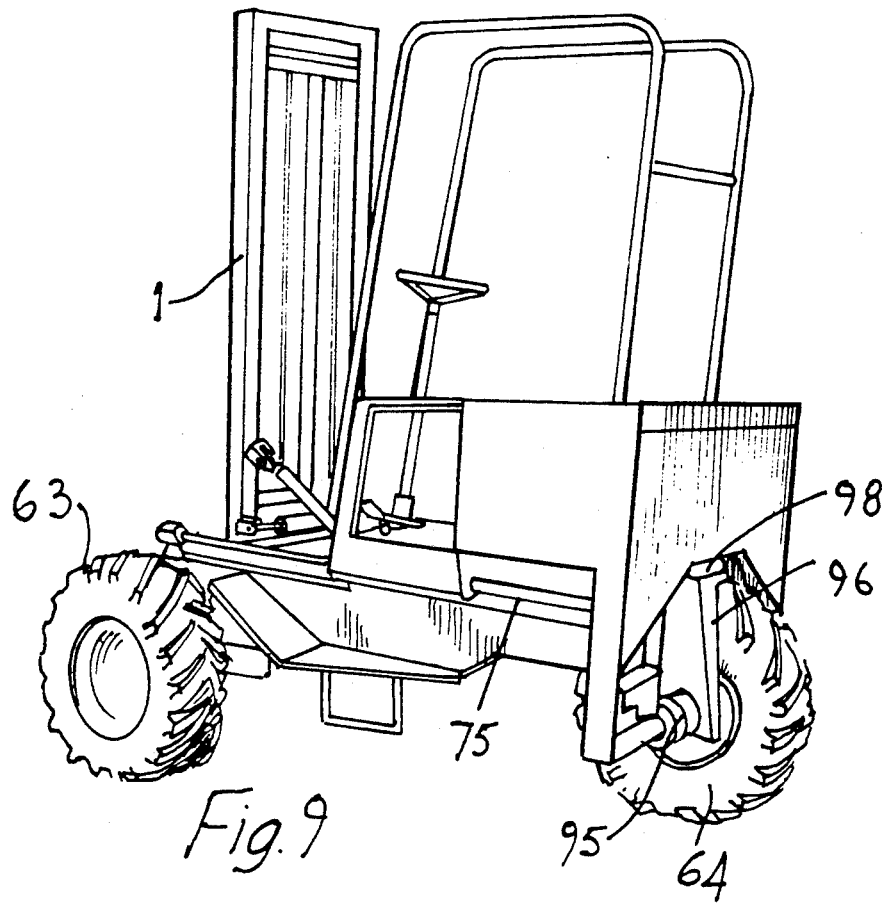
FIG. 9 is a rear perspective view of the forklift truck.
Figure 10:
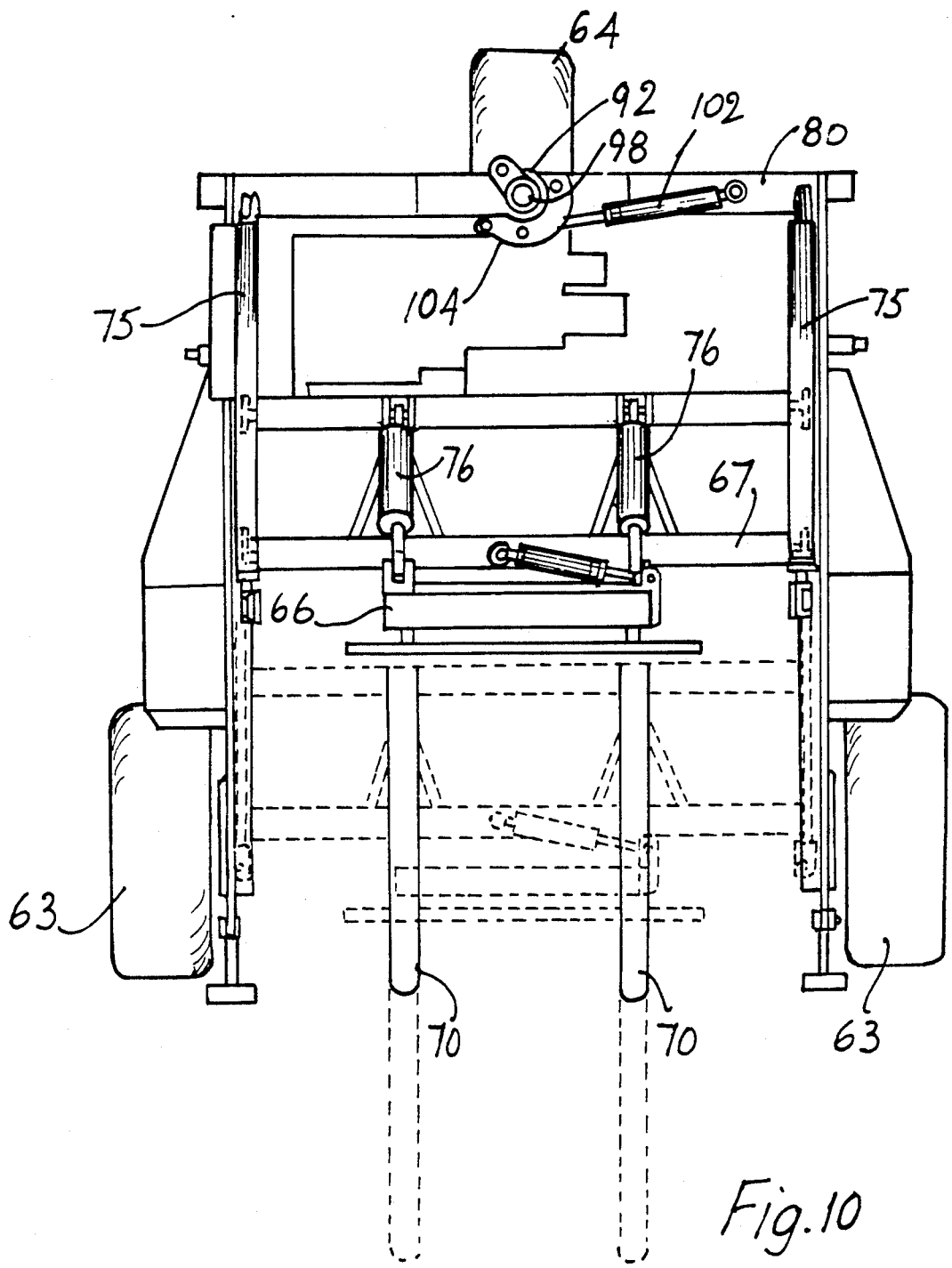
FIG. 10 is a plan view of the forklift truck, some portions of which have been removed for clarity.

Referring now to FIGS. 8 to 22 there is illustrated a forklift truck incorporating the mast described with reference to the previous drawings, a forklift truck indicated generally by the reference numeral 60. For clarity, a simplified diagrammatic mast is shown in the drawings. The truck 60 has a generally U-shaped chassis 62 mounted on a pair of drivable front wheels 63 and a rear wheel 64 which is both steerable and drivable. The mast 1 is mounted on the chassis 62 between the front wheels 63 by means of a support carriage 67. The support carriage 67 is slidably movable on the chassis 62 by means of rams 75 at each side of the chassis 62 between a forward extended position as shown in FIG. 8 and a retracted position as shown in FIG. 10. The mast 1 is pivotal on the carriage 67 by means of rams 76 extending between the mast 1 and carriage 67.

Figure 11:
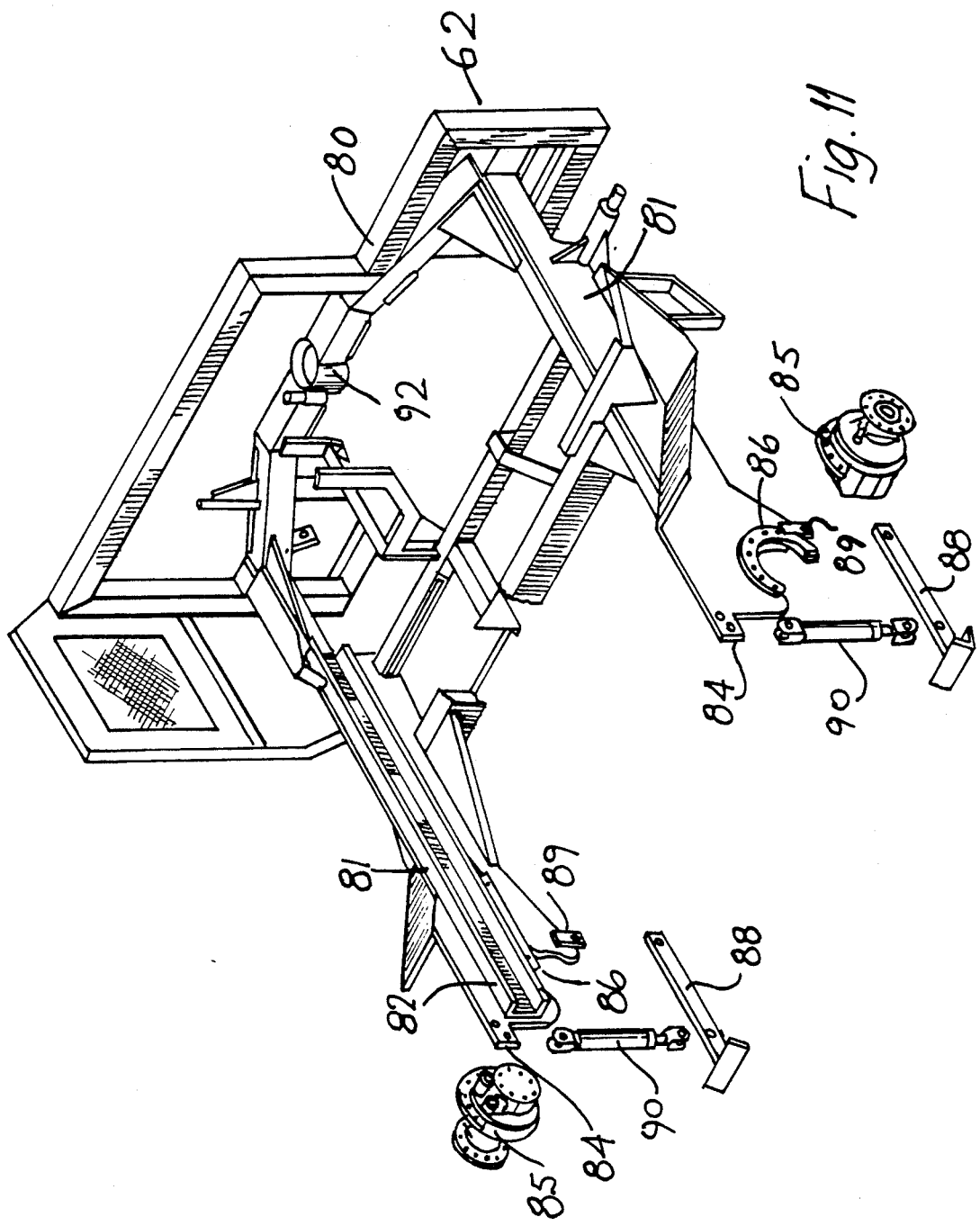
FIG. 11 is an exploded perspective view showing a chassis of the forklift truck.

Referring now in particular FIG. 11, the chassis 62 is generally of U-shape having a rear cross-member 80 and forwardly extending arms 81. Channel section carriage guides 82 extend along an inner face of each arm 81. Each guide 82 is a one-piece cold rolled channel for simple construction and good strength and wear resistance. At a front end 84 of each arm 82 hydraulic drive motors 85 for each front wheel 63 are bolted in complementary arcuate sockets 86. Stabiliser arms 88 are pivotally mounted at 89 on the front end 84 of each arm 81. A ram 90 extends between the front end 84 and the stabiliser arm 88 to pivotally raise and lower the stabiliser arm 88.

A tubular bearing housing 92 is centrally located on the rear cross member 80. The rear wheel 64 has an hydraulic drive motor 95 mounted on a steering arm 96 which is pivotally mounted by a pivot shaft 98 which engages bearings located in the bearing housing 92. A steering ram 102 (see FIG. 10) extends between the cross member 80 and a steering link arm assembly 104 connected to the pivot shaft 98, the ram 102 being operable to rotate the steering arm 96 and thus the rear wheel 64.

Figure 12:
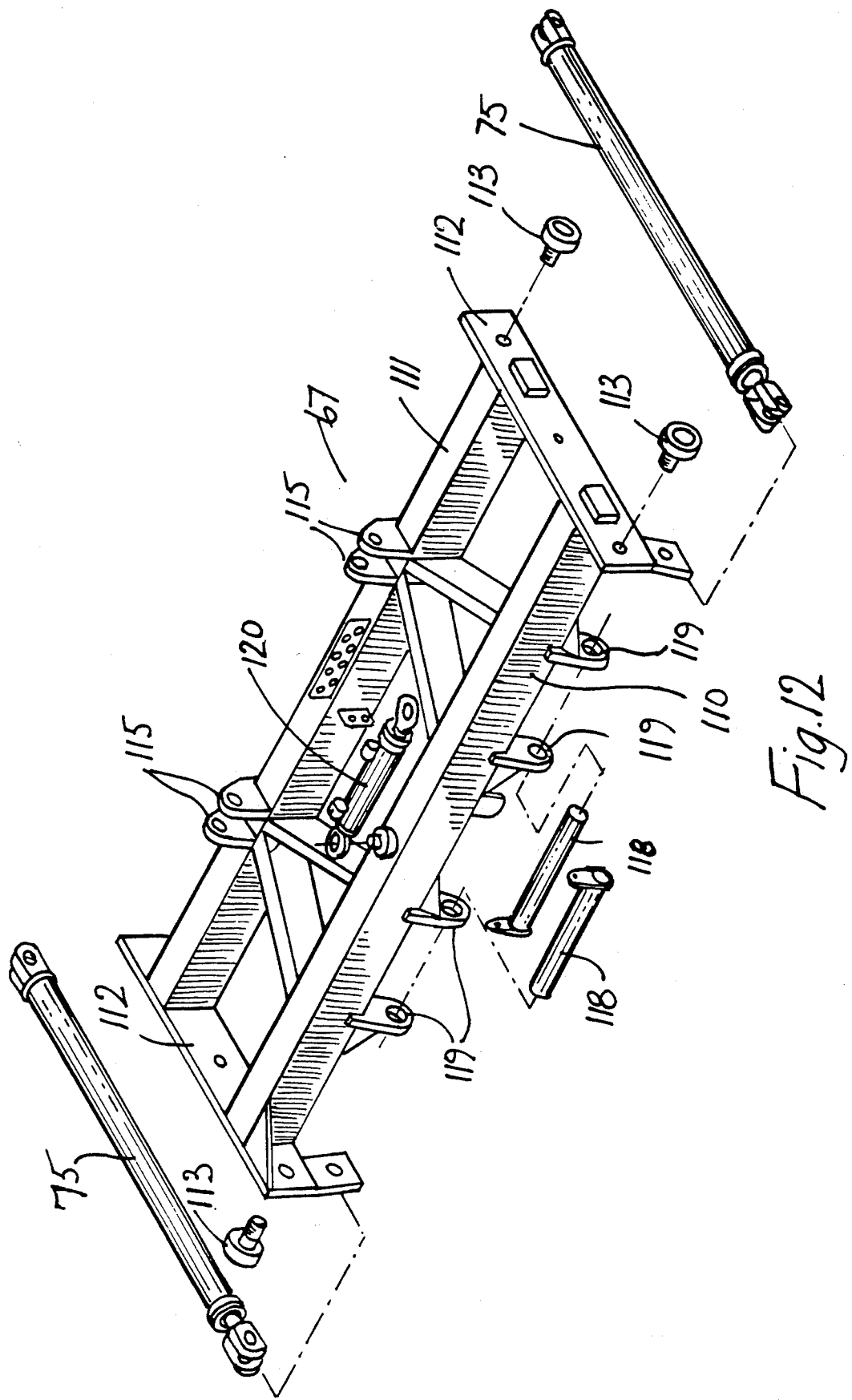
FIG. 12 is an exploded perspective view of a mast support carriage forming portion of the truck.
Figure 13:
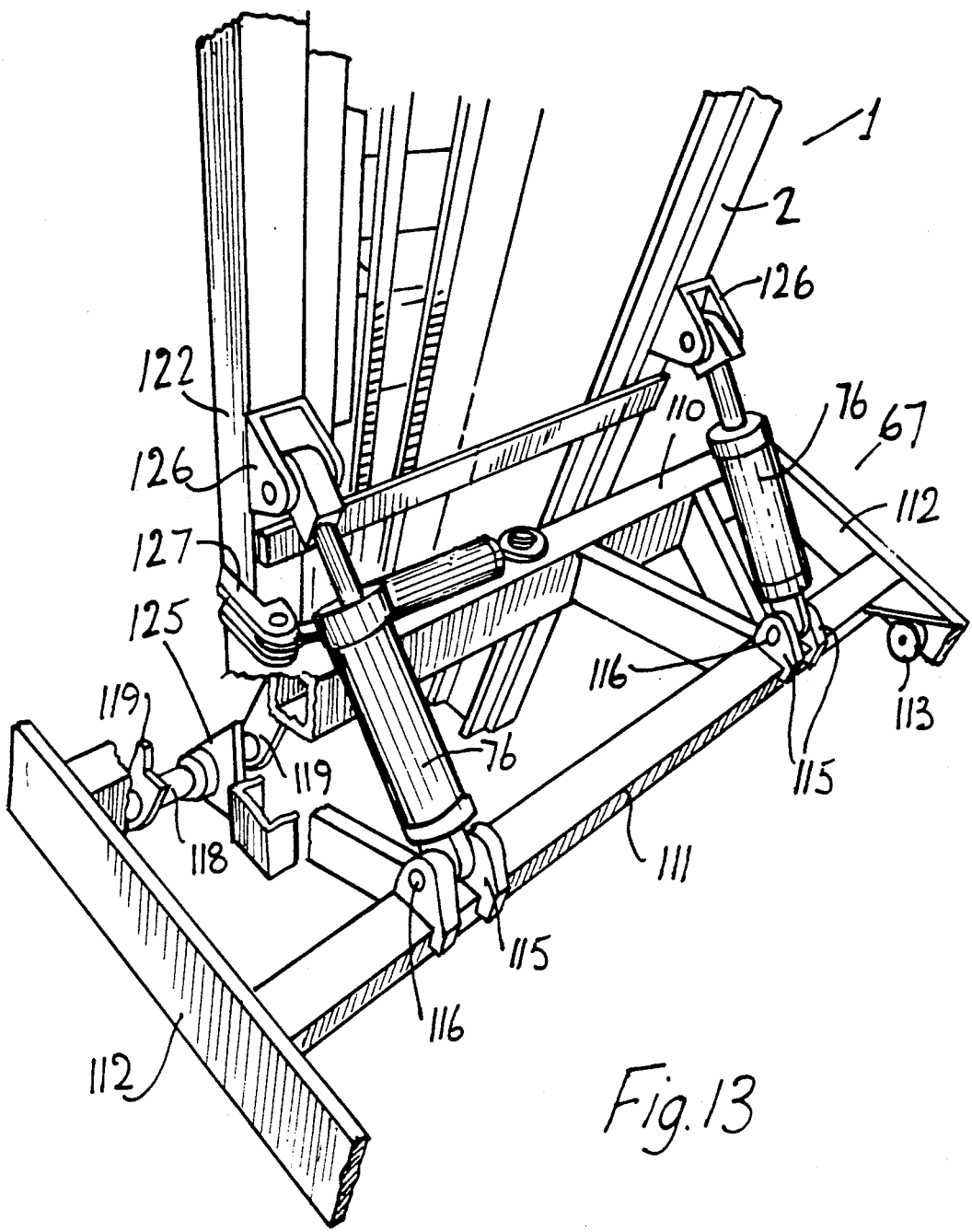
FIG. 13 is a detail perspective partially cut-away view showing the attachment of a mast to the carriage.

Referring now in particular to FIGS. 12 and 13 the carriage 67 is I-shaped having a pair of cross members, namely, a front cross member 110 and a rear cross member 111 extending between side members 112. Roller bearings 113 mounted on each side member 112 engage with the carriage guides 82 on the chassis 62. Mast tilt ram mounting brackets 115 are provided on the rear cross member 111, the tilt rams 76 being mounted on the brackets 115 by pivot pins 116. On the front member 110 mast mounting pins 118 are each supported in a pair of spaced-apart brackets 119. It will be noted that the pins 118 are elongate to allow lateral movement of the mast 1 on the carriage A side shift ram 120 is mounted on the front cross member 110 and engages with the mast 1, the ram 120 being operable to slide the mast 1 laterally on the carriage 67. Tubular mast supports 125 (FIG. 13) are mounted on a rear face of the outer mast section 2 and slidably engage the pins 118 on the carriage 67. Tilt ram mounting brackets 126 project rearwardly of the outer mast section 2 for engagement by the tilt rams 76. On one side of the outer mast section 2 a mounting bracket 127 for engagement by the side shift ram 120 is provided.

Figure 16:
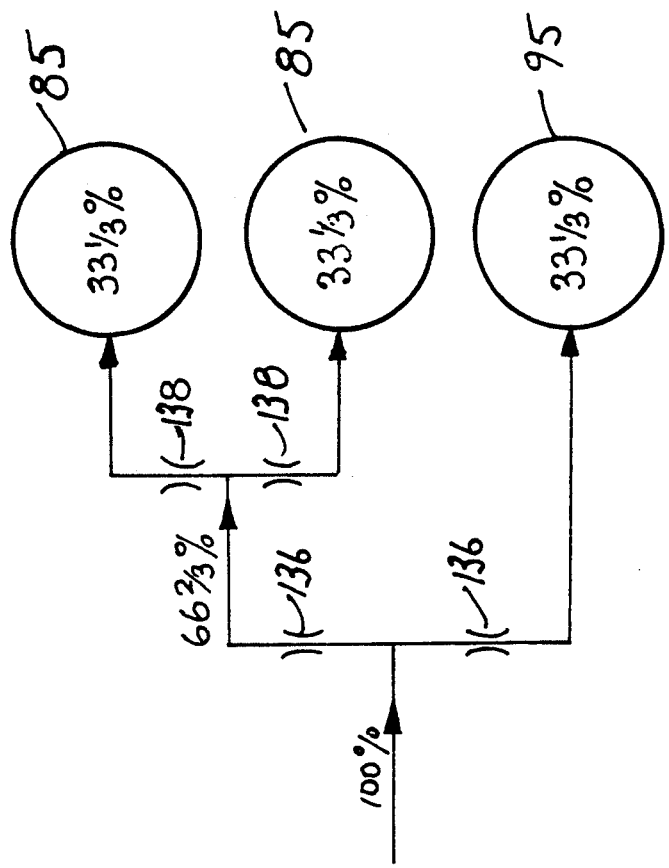
FIG. 15 and FIG. 16 are schematic illustrations of operation of the drive circuit.
Figure 15:
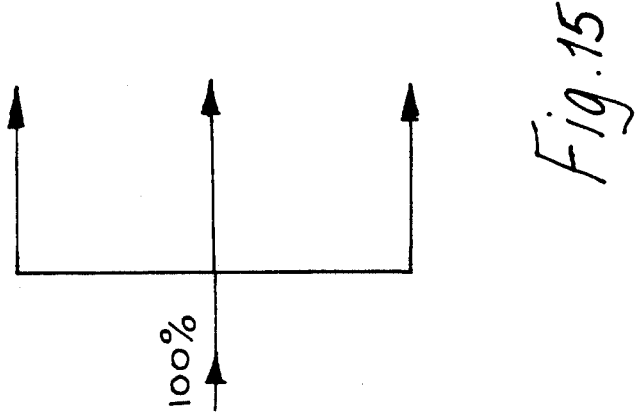
Figure 18:
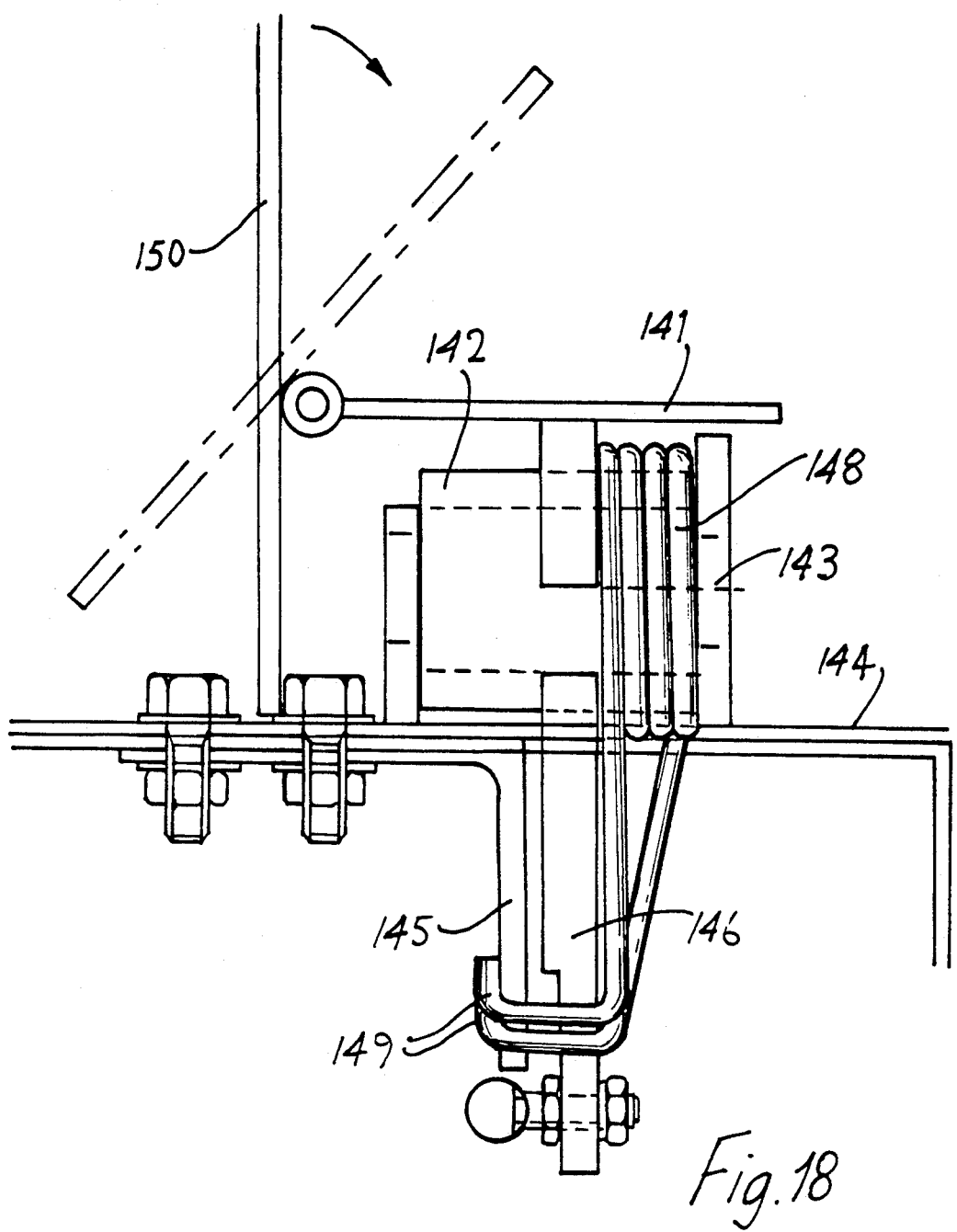
FIG. 18 is a front elevational view of the drive pedal assembly.

Referring now to FIGS. 14 to 16 the hydraulic drive for the wheels 63, 64 of the forklift truck 60 is illustrated. An hydraulic pump 134 supplies hydraulic fluid through a fluid supply divider means 135 to the hydraulic motors 85, 95 on the front wheels 63 and rear wheel 64. The divider 135 is operable to connect fluid supply from the pump 134 directly to all three wheel motors 85, 95 as schematically illustrated in FIG. 15. Alternatively, the divider 135 can be operated to deliver one-third of the fluid supply from the pump 134 to each wheel motor 85, 95 as schematically illustrated in FIG. 16. Primary flow dividers 136 split the fluid supply 137 from the pump in the ratio 1:2 one-third of the fluid being delivered directly to the rear wheel drive motor 95. Secondary dividers 138 split the other fluid supply stream (containing two-thirds of the supply from the pump 134) in half, delivering one-third of the original supply from the pump 134 to each of the front wheel drive motors 85. In use, when the divider is disengaged and the pump 134 freely supplies all motors 85, 95, if one wheel 63, 64 loses traction then the fluid supply will tend to be directed towards the wheels 63, 64. To ensure positive drive to all wheels 63, 64 in the circumstances, the divider 135 can be engaged ensuring a maximum of one-third of the fluid supply can be directed to the slipping wheels 63, 64 and thus maintaining drive to the remaining wheels 63, 64.

Figure 19:
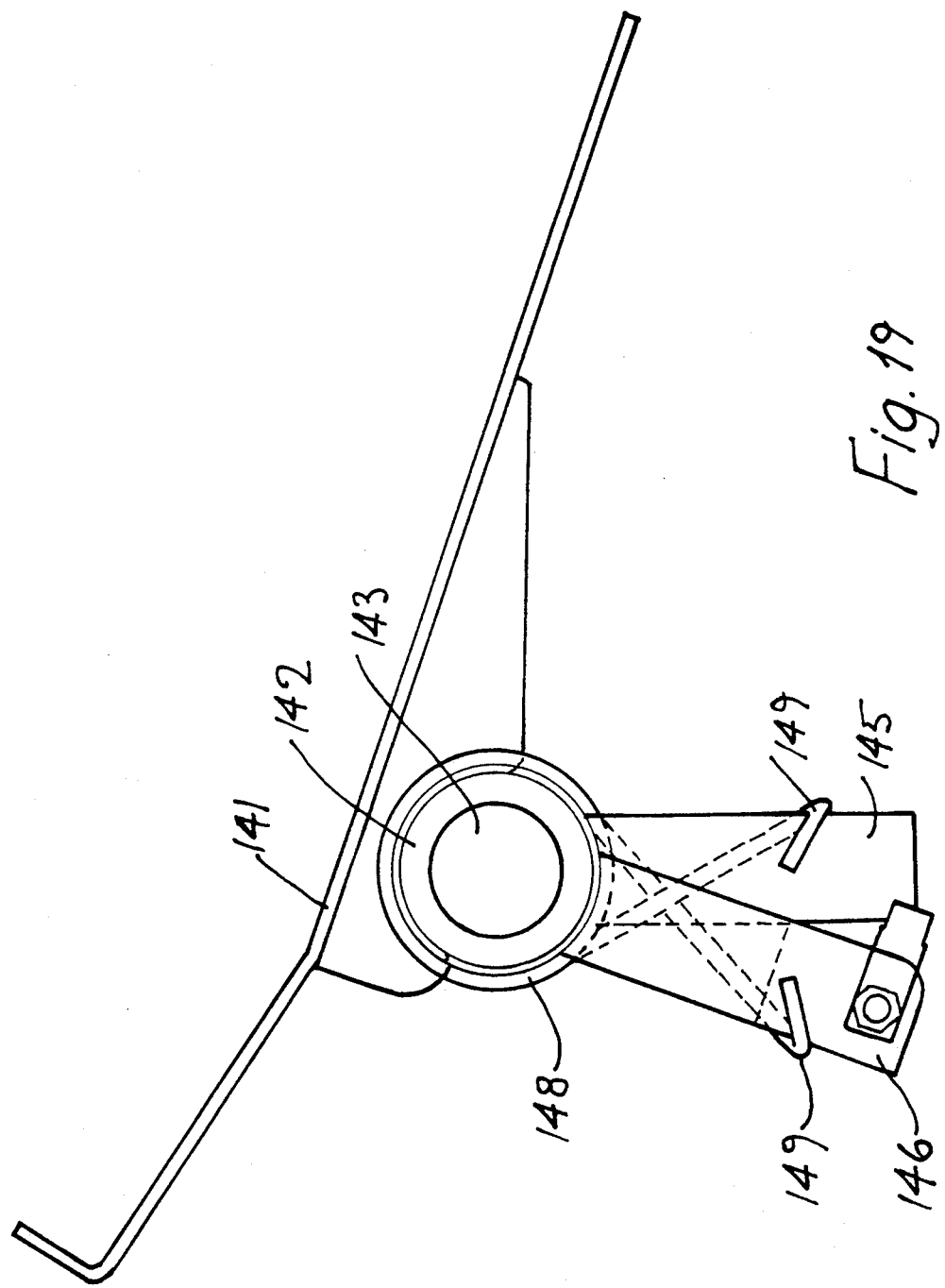
FIG. 19 is a side elevational view of the drive pedal assembly.
Figure 20:
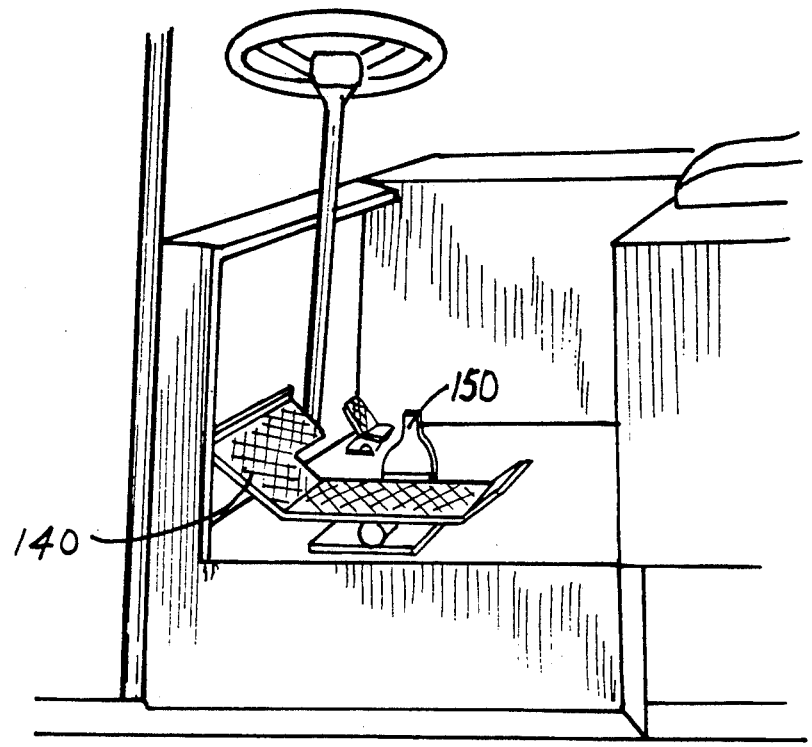
FIG. 20 is a detail perspective view of a driving position on the forklift truck showing the mounting of the drive pedal assembly on the forklift truck.
Figure 21:
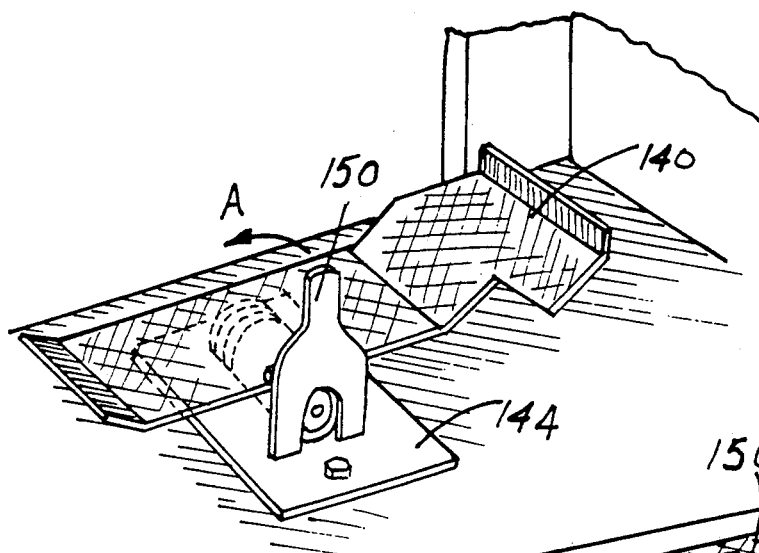
FIG. 21 is a detail perspective view of the drive pedal assembly mounted on the forklift truck, shown in one position.
Figure 22:
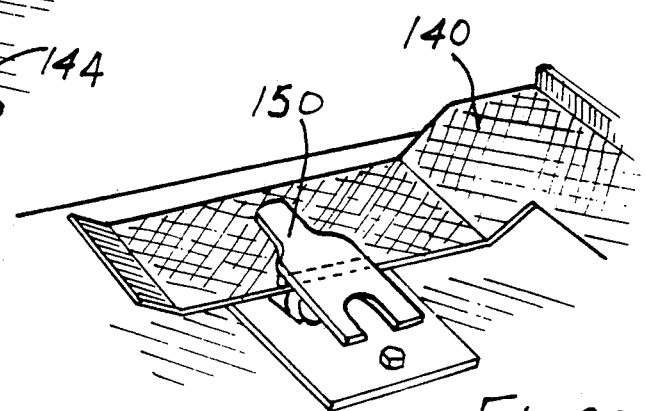
FIG. 22 is a detail perspective view of the drive pedal assembly mounted on the forklift truck, show in another position.

Referring now to FIGS. 17 to 22 a forward/reverse drive pedal 140 is shown. The drive pedal 140 has a foot plate 141 attached to a collar 142 pivotally mounted on a pivot shaft 143. The pivot shaft 143 is supported on a mounting plate 144 having a downwardly depending arm 145. A radial arm 146 on the collar 142 extends downwardly through a slot 147 in the plate 144 alongside the arm 145. A torsion spring 148 is mounted on the collar 142 and has downwardly supporting ends 149 which cross and wrap around the arms 145, 146. Thus, the spring 148 establishes a neutral position for the pedal 140. To operate the forward/reverse drive the pedal is pivoted on the shaft 143, as shown in FIG. 19, and when released the pedal 140 returns to the central neutral position. A safety lock is provided to prevent operation of the pedal 140. The safety lock comprises a locking plate 150 pivotally mounted at one side of the foot plate 141, a lower end 151 of the locking plate 150 abutting the support plate 164 in the engaged position shown in FIGS. 17, 20 and 21. For operation of the pedal 140 the locking plate 150 must be pivoted in the direction of arrow A (FIG. 17) flat against the foot plate 141. The hinge mounting of the locking plate 150 may incorporate a spring to urge the locking plate 150 into the engaged position. Alternatively, the locking plate 150 is weight biased into the engaged position by having a lower portion of the locking plate 150 of greater weight than the upwardly projecting portion of the locking plate 150 above the foot plate 141. FIG. 20 shows the drive pedal 140 mounted at a driving position on the forklift truck 60. It will be noted that the pedal 140 is mounted at the entry to the driving position and engagement of the locking plate 150 prevents inadvertent use of the drive pedal 140 when mounting or dismounting from the driving position.

The invention is not limited to the embodiments hereinbefore described which may be varied in both construction and detail.

We claim:

1. A double-acting multi-stage mast for a forklift truck, comprising a three-stage telescopic mast having an outer mast section, a middle mast section, and an inner mast section, the outer mast section for attachment to the truck, the middle mast section slidably mounted on the outer mast section, a ram means extending between the middle mast section and the outer mast section for sliding the middle mast section on the outer mast section, the inner mast section slidably mounted on the middle mast section, an inner mast section lifting chain extending between the outer mast section and a lower end of the inner mast section passing over an associated first guide on the middle mast section, the first guide being at an upper end of the middle mast section, a fork carriage slidably mounted on the inner mast section, a fork carriage lifting chain extending between the middle mast section and the fork carriage passing over a second guide on the inner mast section, the second guide being adjacent an upper end of the inner mast section, an inner mast section lowering chain extending between the outer mast section and a lower end of the inner mast section passing over a third guide on the middle mast section, the third guide being adjacent a lower end of the middle mast section, and a fork carriage lowering chain extending between the middle mast section and the fork carriage passing over a fourth guide on the inner mast section adjacent the lower end of the middle mast section.

2. A mast as claimed in claim 1 wherein mounting means is provided for pivotally mounting the mast on the forklift truck and means is provided for tilting the mast on the forklift truck.

3. A mast as claimed in claim 2 wherein the mounting means includes means for laterally moving the mast on the forklift truck.

4. A mast as claimed in claim 1 wherein the fork carriage comprises a frame with a lifting attachment support rotatably mounted on the frame.

5. A mast as claimed in claim 4 wherein the lifting attachment support is pivotally mounted adjacent its lower end to the frame.

6. A mast as claimed in claim 4 wherein the lifting attachment support is pivotable on the frame by ram means extending between the frame and the lifting attachment support.

7. A mast as claimed in claim 6 wherein the lifting attachment support is pivotable on the frame by ram means extending between the frame and the lifting attachment support.

8. A mast as claimed in claim 6 wherein an upper periphery of the lifting attachment support is slidably mounted within a guide on the frame.

9. A mast as claimed in claim 8 wherein the guide is formed by an arcuate channel for reception of an upper arcuate peripheral portion of the lifting attachment support.

10. A mast as claimed in claim 9 wherein a rubbing strip is provided within the channel between the lifting attachment support and the frame.

11. A forklift truck incorporating a double-acting multi-stage mast as claimed in claim 10.

12. A forklift truck incorporated a double-acting multi-stage mast as claimed in claim 4.

13. A forklift truck incorporating a double-acting multi-stage mast as claimed in claim 1.

14. A forklift truck as claimed in claim 13 comprising a wheeled chassis having a pair of front wheels and a pivotable rear wheel with an associated steering mechanism, drive means on the chassis for driving at least one wheel, the multi-stage mast mounted on the chassis between the two front wheels, the mast being mounted on the chassis by a support carriage movable on the chassis between the front wheels perpendicular to the axis of the front wheels, the mast pivotally mounted on the carriage for tilting movement about a transverse axis of the vehicle, and the mast being laterally movable on the carriage.

15. A forklift truck as claimed in claim 14 wherein drive means is provided for each wheel, the drive means comprising an hydraulic motor mounted at each wheel, a pump to supply hydraulic fluid to the drive motors and fluid supply divider means between the pump and the motors operable to regulate the supply of fluid to each wheel motor.

16. A forklift truck as claimed in claim 15 wherein the divider means is operable to deliver one-third of the fluid supply from the pump to each wheel motor.

17. A forklift truck as claimed in claim 14 wherein the rear wheel is mounted by a vertical pivot shaft on the chassis and the steering mechanism comprises a ram extending between the chassis and a steering arm on the pivot shaft, the ram operably connected to a steering wheel on the chassis.

18. A forklift truck as claimed in claim 14 having a drive pedal for controlling power supply to the wheels, with a safety lock for the drive pedal operable to prevent operation of the drive pedal.

* * * * *

UNITED STATES PATENT AND TRADEMARK OFFICE
CERTIFICATE OF CORRECTION

PATENT NO. : 5,328,321
DATED : July 12, 1994
INVENTOR(S) : Carol Moffett, et al.

It is certified that error appears in the above-indentified patent and that said Letters Patent is hereby corrected as shown below:

Column 4, line 26: after "member" insert --52--

Column 5, line 29: after "carriage" insert --67.--

Column 7, line 34, Claim 12: "incorporated" should read --incorporating--

Signed and Sealed this

Fifth Day of September, 1995

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,328,321
APPLICATION NO. : 07/921899
DATED : July 12, 1994
INVENTOR(S) : Carol Moffett and James McAdam Page 1 of 1

It is certified that error appears in the above-identified patent and that said Letters Patent is hereby corrected as shown below:

Column 6, line 66, "middle" should be --inner--.

Signed and Sealed this

Tenth Day of February, 2009

JOHN DOLL
*Acting Director of the United States Patent and Trademark Office*